US010936809B2

(12) United States Patent
Majumder et al.

(10) Patent No.: US 10,936,809 B2
(45) Date of Patent: Mar. 2, 2021

(54) METHOD OF OPTIMIZED PARSING UNSTRUCTURED AND GARBLED TEXTS LACKING WHITESPACES

(71) Applicant: Dell Products L.P., Round Rock, TX (US)

(72) Inventors: Prabir Majumder, Plano, TX (US); Jeffrey S. Vah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 170 days.

(21) Appl. No.: 16/127,410

(22) Filed: Sep. 11, 2018

(65) Prior Publication Data

US 2020/0081972 A1 Mar. 12, 2020

(51) Int. Cl.
*G06F 40/205* (2020.01)
*G06F 16/34* (2019.01)

(52) U.S. Cl.
CPC .......... *G06F 40/205* (2020.01); *G06F 16/345* (2019.01)

(58) Field of Classification Search
USPC ....................................................... 704/1–504
See application file for complete search history.

(56) References Cited

U.S. PATENT DOCUMENTS

| | | | | |
|---|---|---|---|---|
| 6,233,545 B1* | 5/2001 | Datig | ..................... | G06N 3/004 704/2 |
| 6,341,372 B1* | 1/2002 | Datig | ..................... | G06N 3/004 715/234 |
| 6,745,161 B1* | 6/2004 | Arnold | ................ | G06F 16/3338 704/7 |
| 6,910,003 B1* | 6/2005 | Arnold | ................ | G06F 16/3338 704/4 |
| 7,143,091 B2* | 11/2006 | Charnock | .............. | G06Q 10/10 |
| 7,742,953 B2* | 6/2010 | King | ....................... | G06Q 10/10 705/26.1 |
| 7,818,215 B2* | 10/2010 | King | ....................... | G06Q 30/06 705/26.1 |
| 7,912,705 B2* | 3/2011 | Wasson | ................. | G06F 40/289 704/9 |
| 8,418,055 B2* | 4/2013 | King | ..................... | G06F 40/174 715/234 |
| 8,874,504 B2* | 10/2014 | King | .................. | G06F 16/9554 707/608 |
| 2002/0198697 A1* | 12/2002 | Datig | ..................... | G06N 3/004 704/1 |
| 2003/0182310 A1* | 9/2003 | Charnock | .............. | G06Q 10/10 |
| 2005/0234707 A1* | 10/2005 | Luo | ........................ | G06F 40/211 704/9 |
| 2006/0253418 A1* | 11/2006 | Charnock | ............... | G06F 16/34 |
| 2010/0195909 A1* | 8/2010 | Wasson | ................. | G06F 40/169 382/176 |
| 2020/0081972 A1* | 3/2020 | Majumder | ............. | G06F 16/34 |

* cited by examiner

*Primary Examiner* — Marcus T Riley
(74) *Attorney, Agent, or Firm* — Terrile, Cannatti & Chambers; Stephen A. Terrile (57) ABSTRACT

A system, method, and computer-readable medium for performing a text parsing operation. The text parsing operation includes: receiving a corpus of text, at least a portion of the corpus of text comprising garbled text; parsing characters within the corpus of text to provide parsed characters from the corpus of text; parsing the parsed characters to generate recognized words from the parsed characters; generating semi-structured text from the recognized words; and, calculating a distribution of recognized words from the semi-structured text.

20 Claims, 8 Drawing Sheets

METHOD OF OPTIMIZED PARSING UNSTRUCTURED AND GARBLED TEXTS LACKING WHITESPACES

BACKGROUND OF THE INVENTION

Field of the Invention

The present invention relates to information handling systems. More specifically, embodiments of the invention relate to parsing garbled text to generate semi-structured text.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium for parsing garbled text to generate semi-structured text.

In one embodiment, the invention relates to a method for performing a text parsing operation, comprising: receiving a corpus of text, at least a portion of the corpus of text comprising garbled text; parsing characters within the corpus of text to provide parsed characters from the corpus of text; parsing the parsed characters to generate recognized words from the parsed characters; generating semi-structured text from the recognized words; and, calculating a distribution of recognized words from the semi-structured text.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a corpus of text, at least a portion of the corpus of text comprising garbled text; parsing characters within the corpus of text to provide parsed characters from the corpus of text; parsing the parsed characters to generate recognized words from the parsed characters; generating semi-structured text from the recognized words; and, calculating a distribution of recognized words from the semi-structured text.

In another embodiment, the invention relates to a non-transitory, computer-readable storage medium embodying computer program code, the computer program code comprising computer executable instructions configured for: receiving a corpus of text, at least a portion of the corpus of text comprising garbled text; parsing characters within the corpus of text to provide parsed characters from the corpus of text; parsing the parsed characters to generate recognized words from the parsed characters; generating semi-structured text from the recognized words; and, calculating a distribution of recognized words from the semi-structured text.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5*a* through 5*c* are a flowchart showing the performance of garbled text parsing operations.

DETAILED DESCRIPTION

A system, method, and computer-readable medium are disclosed for parsing garbled text to generate semi-structured text. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
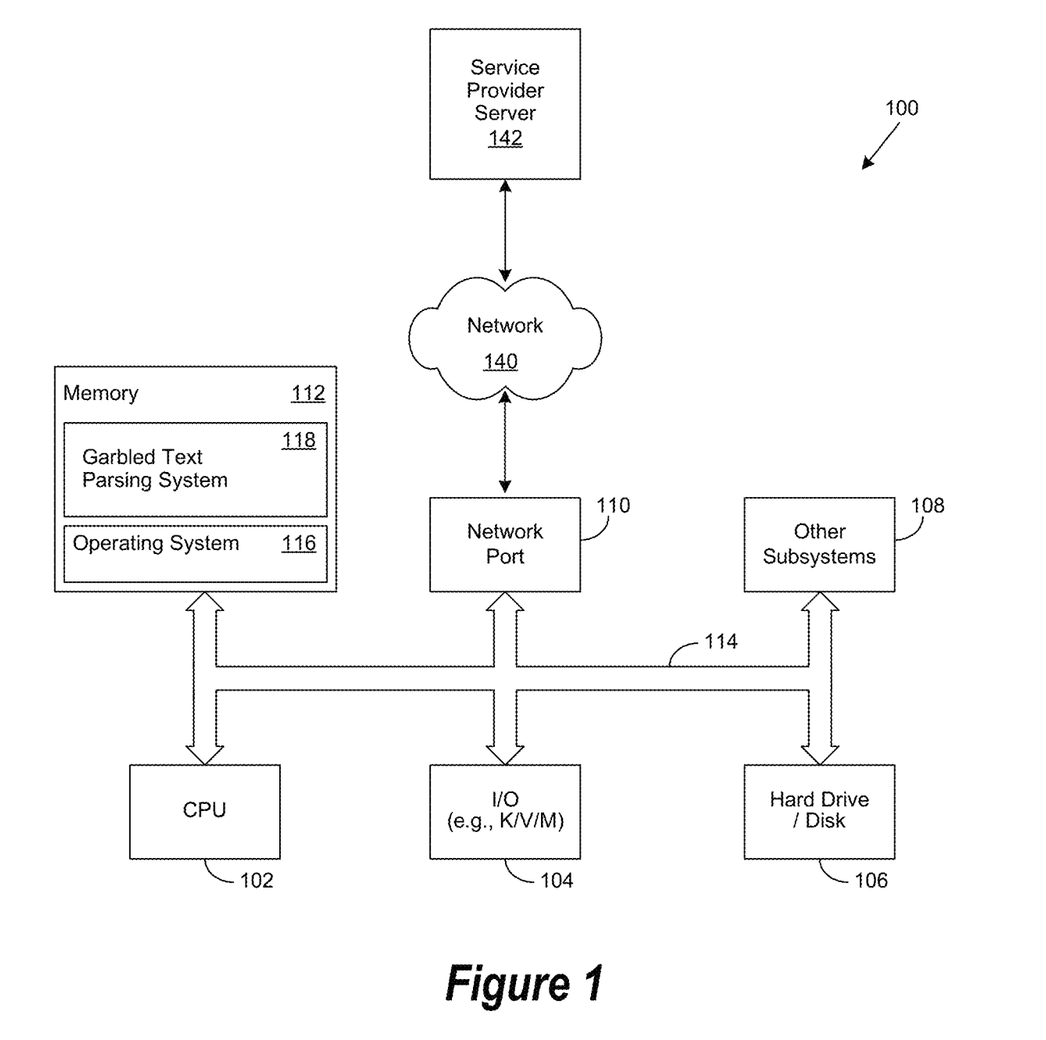
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a garbled text parsing system 118.

The garbled text parsing system 118 performs a garbled text parsing operation. The garbled text parsing operation improves processor efficiency, and thus the efficiency of the information handling system 100, by facilitating garbled text parsing. In certain embodiments, the garbled text parsing operation can be performed during operation of an information handling system 100. As will be appreciated, once the information handling system 100 is configured to perform the garbled text parsing operation, the information handling system 100 becomes a specialized computing device specifically configured to perform the system failure identification operation and is not a general purpose computing device. Moreover, the implementation of the garbled text parsing operation on the information handling system 100 improves the functionality of the information handling system 100 and provides a useful and concrete result of performing garbled text parsing operations. In certain embodiments, the garbled text parsing operation results in searching for certain keywords.

Figure 2:
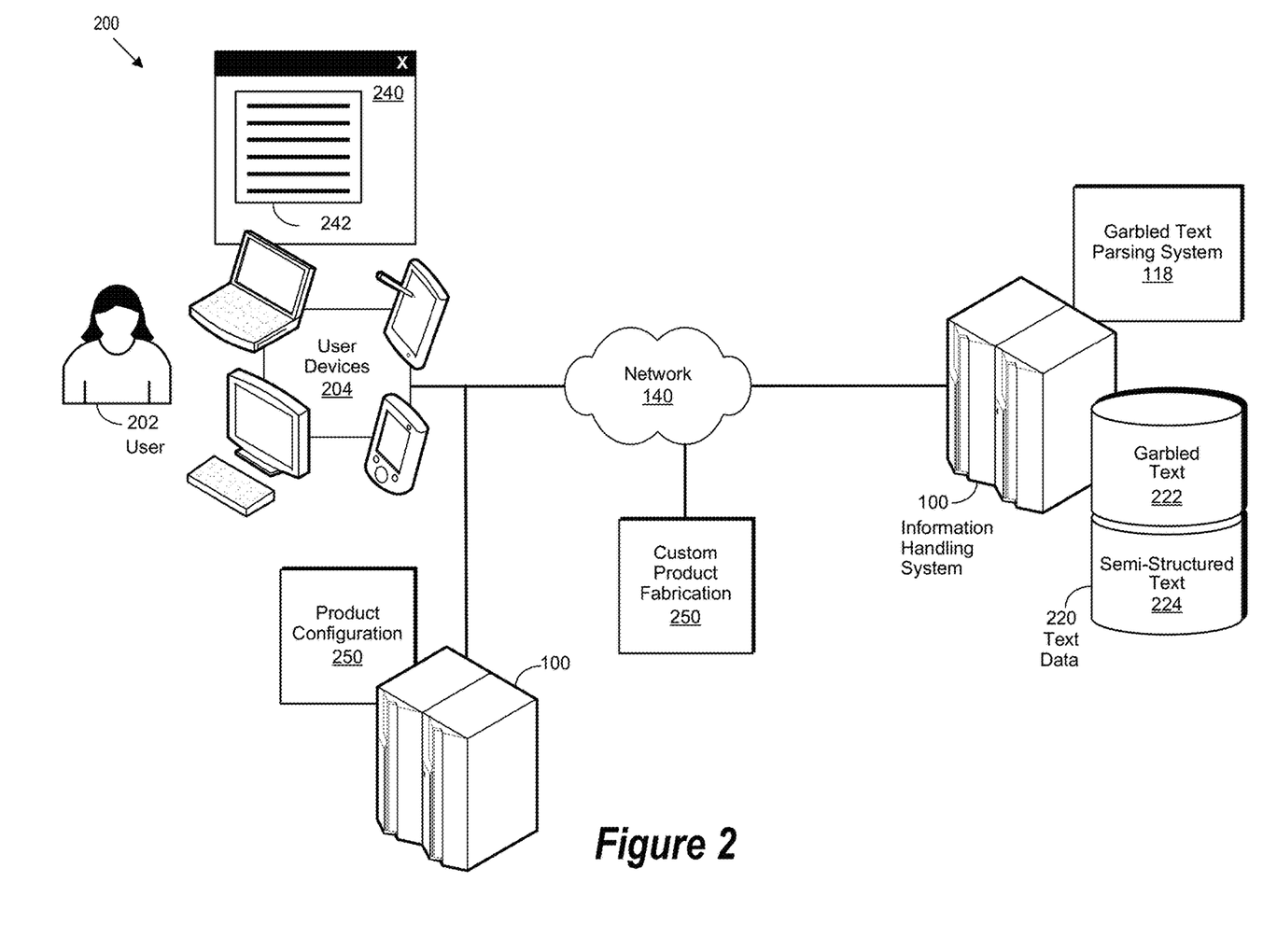
FIG. 2 shows a block diagram of a garbled text parsing environment.

FIG. 2 is a block diagram of a garbled text parsing environment 200 implemented in accordance with an embodiment of the invention. In certain embodiments, the garbled text parsing environment 200 may include a garbled text parsing system 118. In certain embodiments, the garbled text parsing environment 200 may include a repository of text data 220. In certain embodiments, the repository of text data 220 may be local to the system executing the garbled text parsing system 118 or may be executed remotely. In certain embodiments, the repository of text data 220 may include various information associated with source garbled text 222 and parsed semi-structured text 224.

In various embodiments, the garbled text parsing system 118 may be implemented to receive certain garbled text 222 from various sources (not shown). In certain embodiments, the source of the garbled text 222 may be a user 202, a system, a datastore, an automated or semi-automated process, or a combination thereof. In various embodiments, the garbled text 222 received by the garbled text parsing system 118 may be persistently stored in the repository of text data 220. In certain embodiments, the garbled text 222 stored in the repository of text data 220 may be used to generate various semi-structured texts 224, described in greater detail herein. In various embodiments, the resulting semi-structured texts 224 may be persistently stored in the repository of text data 220.

In certain embodiments, a user 202 may use a user device 204 to interact with the garbled text parsing system 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a garbled text parsing system user interface (UI) 240. In certain embodiments, the garbled text parsing system UI 240 may be implemented to present a graphical representation 242 of garbled text parsing information, which is automatically generated in response to interaction with the garbled text parsing system 118.

In certain embodiments, the user device 204 is used to exchange information between the user 202 and the garbled text parsing system 118, a product configuration system 250, and a custom product fabrication system 250, through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention. In various embodiments, the garbled text parsing system UI 240 may be presented via a website. In certain embodiments, the website may be provided by one or more of the garbled text parsing system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

In certain embodiments, the garbled text parsing system 118 may be implemented to interact with the product configuration system 250, which in turn may be executing on a separate information handling system 100. In various embodiments, the product configuration system 250 interacts with the custom product fabrication system 252. In various embodiments, the custom product fabrication system 252 fabricates products, which may result in the generation of garbled text, which in turn may be associated with the custom product fabrication system 252 and the products it may fabricate. In certain embodiments, the garbled text parsing system 118 may be implemented to parse the garbled text 222 to generate semi-structured text 224, as described in greater detail herein.

Figure 3:
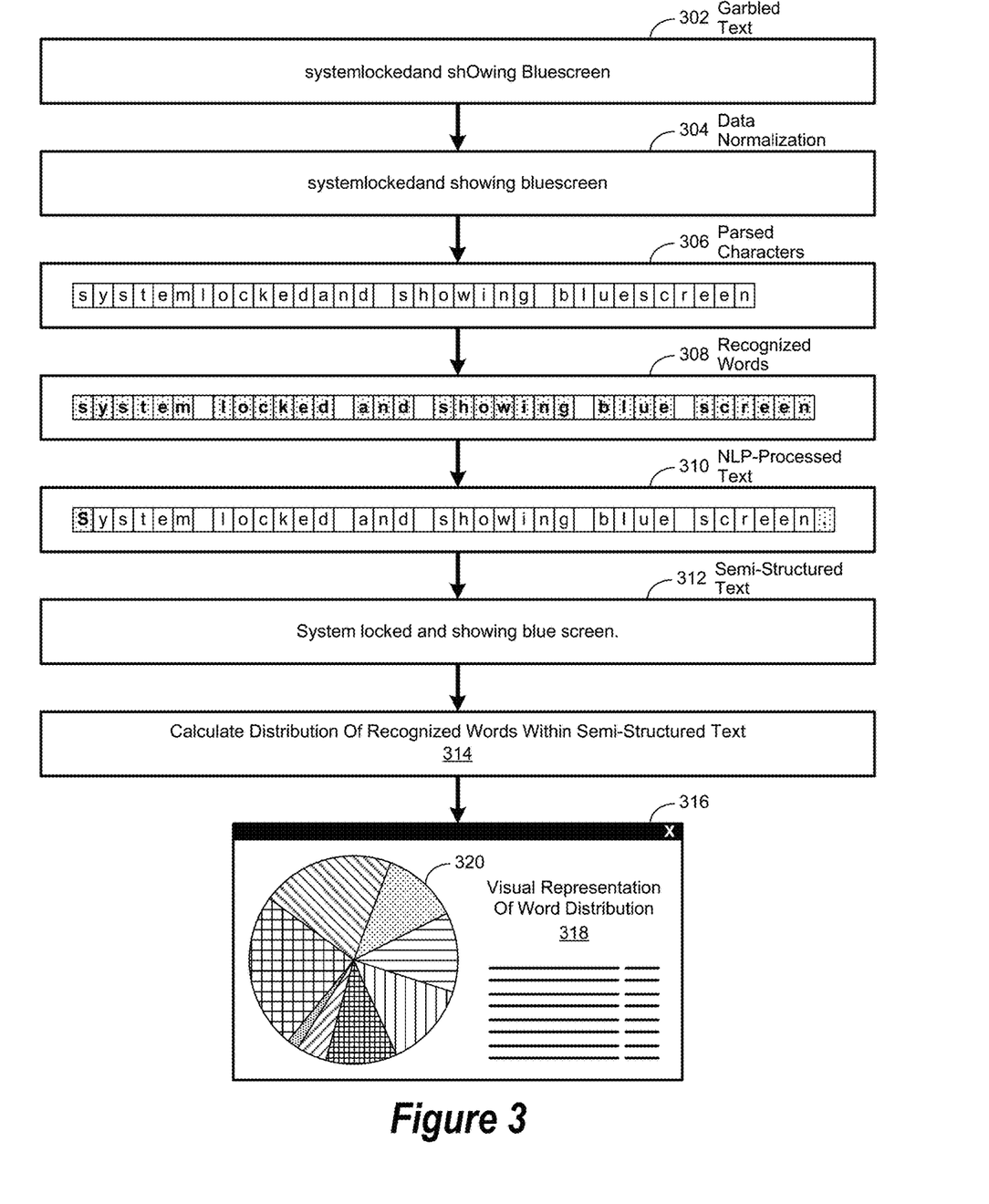
FIG. 3 shows a functional block diagram of the performance of garbled text parsing operations.

FIG. 3 shows a functional block diagram of the performance of garbled text parsing operations implemented in accordance with an embodiment of the invention. As used herein, garbled text broadly refers to a set of confused or unintelligible words. As an example, two or more words may be inadvertently concatenated into a single text string, such as "systemlockedand." In this example, the text string "systemlockedand" is a garbled version of the phrase "system locked and." As another example, a particular character of a word may be mistakenly capitalized, such as "shOwing." In various embodiments, the garbled text parsing system 118 may include an algorithm implemented to match of extracted keywords to certain words in an existing dictionary list.

In certain embodiments, the dictionary list may contain words that are commonly used in everyday speech, In various embodiments, the dictionary list may contain words whose spelling is non-standard, are not used in common speech, or are an acronym To continue the prior example, the word "shOwing" is a garbled version of the word "showing," which may appear in a dictionary list of standard words. As another example, the text string "login" may variously refer to the process of logging into a computer system, or when separated into the separate words "log" and "in," may refer to the placement of a timber in the phrase "they put a log in the gap to close it off." In this example, the text string "login" is parsed a single character at a time to see which sub-strings of text may exist in dictionary list of standard words. To continue the example, a space is placed between the text sub-strings "log" and "in" if it is determined the original text string is garbled and refers to timbers rather than signing onto a computer system. Skilled practitioners of the art will recognize that many such examples of garbled text are possible. Accordingly, the foregoing is not intended to limit the spirit, scope or intent of the invention.

In this embodiment, a corpus of garbled text, such as "Systemlockedand shOwing Bluescreen," is received in block 302. Data normalization operations are then performed in block 304 such that all characters within the corpus of garbled text are converted to either lower or upper case. As an example, the corpus of garbled text received in block 302 may be normalized to "systemlockedand showing bluescreen."

Various text parsing operations, described in greater detail herein, are then performed in block 308 to generate recognized words from the characters parsed in block 306. In turn, Natural Language Processing (NLP) approaches familiar to those of skill in the art are performed in block 310 to generate complete sentences, which are then provided as semi-structured text in block 312. The frequency distribution of recognized words within the semi-structured text is then calculated in block 314, followed by the generation of a visual representation of their distribution in block 316. In certain embodiments, the visual representation may be provided within a user interface (UI) 316, such as a web browser. In certain embodiments, the visual representation may be provided in the form of a table 320, a pie chart 322, or a combination thereof.

Figure 4:
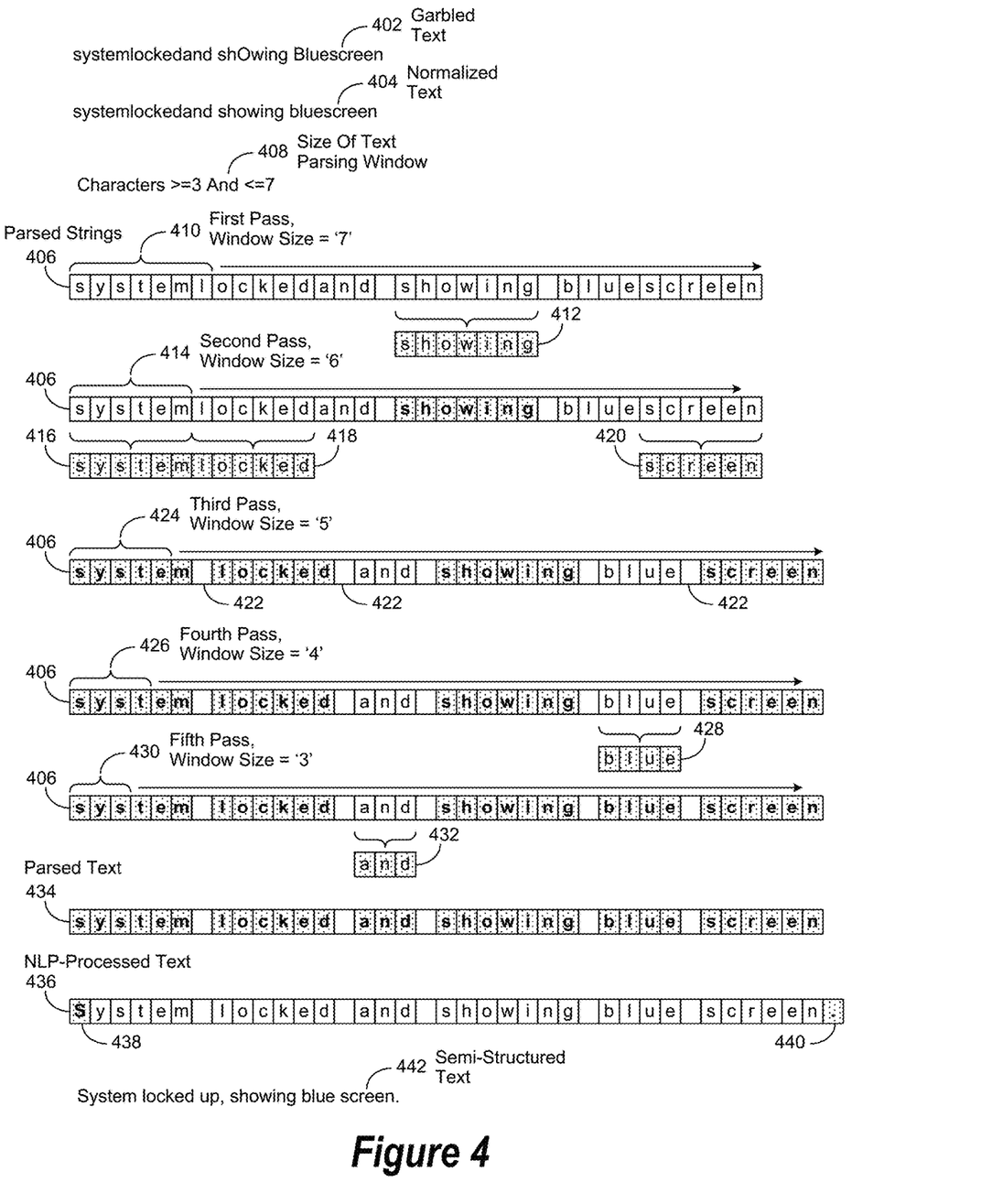
FIG. 4 shows a process flow of operations for parsing a corpus of garbled text into a semi-structured text.

FIG. 4 shows a process flow of operations implemented in accordance with an embodiment of the invention for parsing a corpus of garbled text into a semi-structured text. Certain embodiments of the invention reflect an appreciation that a particular text may contain garbled strings of characters, which in turn may contain various words or sub-strings of meaningful text. As an example, the garbled string of characters "ahightemperatureof104today" contains the words "a," "high," "temperature," "of," and "today," as well as meaningful text of "104."

It will be appreciated that the garbled string of characters "highof104today" may be difficult to interpret unless the individual words it contains (i.e., "a," "high," "temperature," "of," and "today") are parsed out. Likewise, the meaningful text (i.e., "104") it contains may provide context to such parsed words. To continue the example, performing various parsing operations on the string of characters "ahightemperatureof104today," may result in the generation of the semi-structured text "a high temperature of 104 today," which in turn may be interpreted as a high temperature of 104 degrees being reached today.

Certain embodiments of the invention likewise reflect an appreciation that a certain garbled string of characters may contain a sub-string that may be parsed into two different words. To continue the preceding example, the words "temper" and "temperature" could both be parsed from the garbled string of characters "ahightemperatureof104today." However, parsing the word "temper," which is shorter than the word "temperature," would likely result in the generation of the semi-structured text "a high temperature of 104 today," which is more difficult to interpret. Accordingly, in certain embodiments, longer strings of words or meaningful text may be parsed from garbled strings of text before shorter strings are parsed.

In this embodiment, a corpus of garbled text 402, "Systemlockedup showing Bluescreen," is converted into lower-case normalized text 404 "systemlockedup showing bluescreen," as described in greater detail herein. The resulting lower-case normalized text 404 is then processed to generate parsed strings 406 of individual characters. In certain embodiments, the resulting parsed strings 406 of individual characters may be respectively separated by spaces, as shown in FIG. 4.

In certain embodiments, a text parsing window may be implemented to parse words and sub-strings of meaningful text of various lengths from a string of garbled text. As used herein, a text parsing window broadly refers to a number of characters sufficient in length to accommodate a recognized word or a string of meaningful text. In certain embodiments, the size 408 of the text parsing window may be defined by a lower and upper number of characters it may span within a particular string of garbled text. In various embodiments, the upper and lower limits selected for the size 408 of the text parsing window are a matter of design choice. As an example, in this embodiment, the upper limit for the size 408 of the text parsing window is set to be less than or equal to seven characters and its lower limit is set to be greater than or equal to three characters.

In certain embodiments, the text parsing window may be implemented to sequentially search parsed strings 406 of garbled text from their beginning to their end to identify recognized words or other meaningful text. In certain embodiments the text parsing window may be implemented to perform such a sequential search by submitting a sub-string of garbled text that is the same number of characters as its current size as a query to a reference list of recognizable words. In these embodiments, the reference list of recognizable words used in the performance of such a query is a matter of design choice.

If a recognizable word is found, then it is marked as such and the text parsing window is moved to the next unrecognized sub-string of garbled text and the process is repeated. However, if a recognizable word is not found in the sub-string of garbled text, then the text parsing window is moved one character forward within the parsed strings 406 of garbled text and the process is repeated. Once the end of the parsed strings 406 of garbled text is reached, the size of the text parsing window is reduced by one and the process is repeated until the size of the text parsing window is less than its lower limit.

Accordingly, the current size 408 of the text parsing window in this embodiment is initially set to its upper limit, which is seven characters, and a first pass 410 is made through the parsed strings 406 of garbled text to identify a first parsed string that is seven characters or longer. As shown in FIG. 4, while the parsed string "systemlockedand" is larger than the current size 408 of the text parsing window, its first seven characters do not contain a recognizable word. Furthermore, nor does its next seven characters, or the seven characters after that, and so forth, until the end of the parsed string is reached. However, the next parsed string, "showing," in the parsed strings is seven characters long, the same current size 408 of the text parsing window. Accordingly, it is marked 412 as a recognizable word as a result of being submitted as a query to a reference list of recognizable words. The process is completed until the end of the parsed strings 406 of garbled text is reached.

The current size 408 of the text parsing window is then reduced by one, such that it is now six characters in length, and a second pass 412 is made through the parsed strings 406 of garbled text to identify a first parsed string 406 that is six characters or longer. Consequently, the parsed string 406 "systemlockedand" is identified as being larger than the current size 408 of the text parsing window. Its first sub-string or six characters is then submitted as a query to a list of recognizable words, and a result, the first sub-string is marked 416 as the recognized word "system."

The process is continued, with the result of the parsed string's 406 second sub-string of six characters likewise being submitted as a query to a list of recognizable words. As a result, the second sub-string is likewise marked 418 as the recognized word "locked." The process is further continued, resulting in the identification of a second parsed string 406, "bluescreen," that is six characters or longer. As before, the text parsing window is used to further parse various sub-strings, each of which is submitted as a query to a list of recognized words. However, only the sub-string "screen" is identified as a recognized word and marked 420 as such. As shown in FIG. 4, the recognized words "system, "locked," and "screen" are then respectively padded with spaces 422.

The current size 408 of the text parsing window is once again reduced by one, such that it is now five characters in length, and a third pass 424 is made through the parsed strings 406 of garbled text to identify a first parsed string 406 that is five characters or longer. However, none are identified. Consequently, the current size 408 of the text parsing window is reduced by one, yet again, such that it is now four characters in length, and a fourth pass 426 is made through the parsed strings 406 of garbled text to identify a first parsed string 406 that is four characters or longer. As a result, the parsed string 406 "blue" is identified, submitted as a query to a recognized word list, verified as being such, and marked 428 accordingly. Once again, the current size 408 of the text parsing window is reduced by one, such that it is now three characters in length, and a fifth pass 430 is made through the parsed strings 406 of garbled text to identify a first parsed string 406 that is three characters or longer. As a result, the parsed string 406 "and" is identified, submitted as a query to a recognized word list, verified as being such, and likewise marked 432 accordingly.

Various text parsing operations, described in greater detail herein, are then performed to generate parsed text 434 from the previously-recognized words. In turn, Natural Language Processing (NLP) approaches familiar to those of skill in the art, including capitalizing 438 the first letter of the first recognized word and adding a period 440 to the end of the last recognized word, are performed to generate NLP-processed text 434. The resulting NLP-processed text 434 is then further processed to generate semi-structured text 442.

Figure 5A:
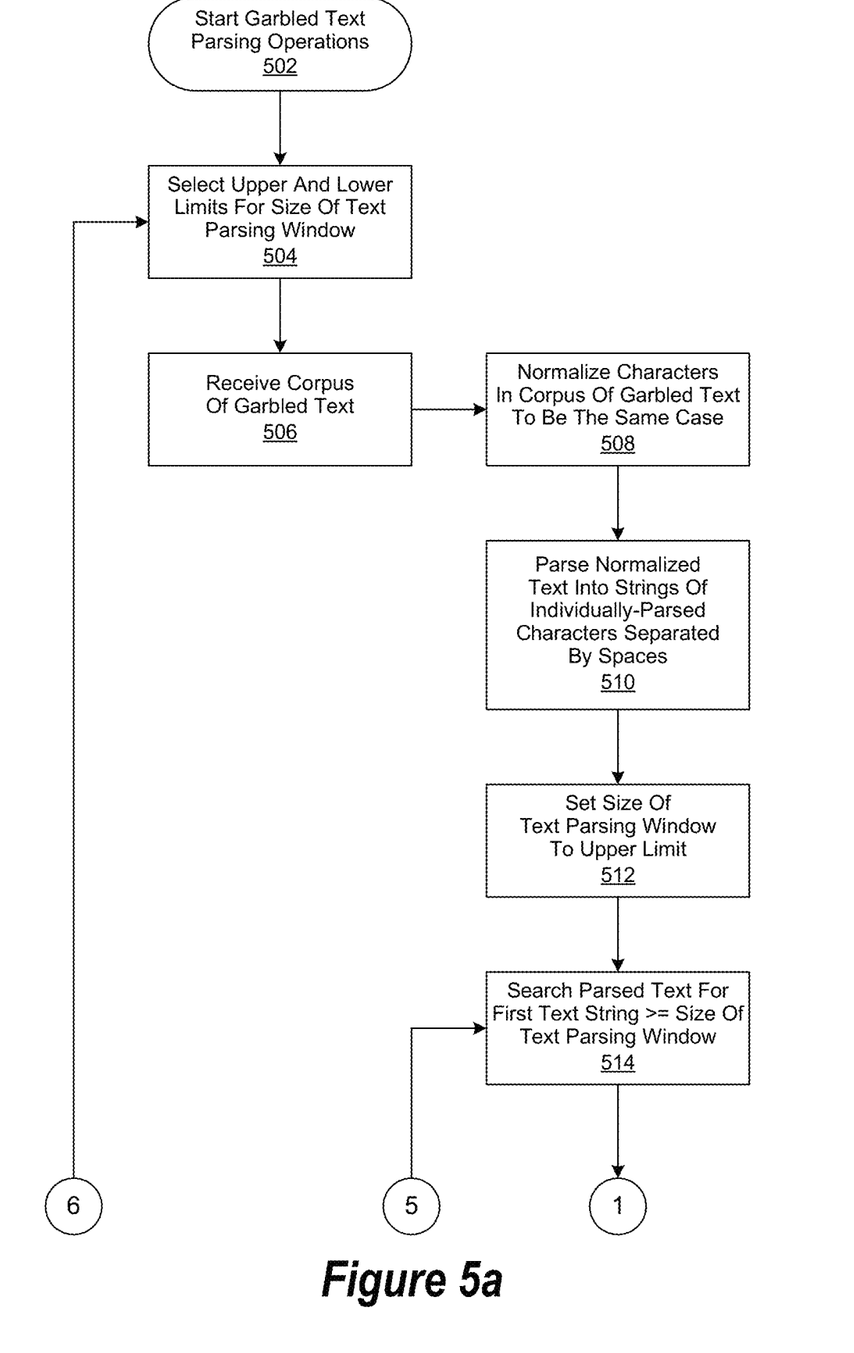
Figure 5B:
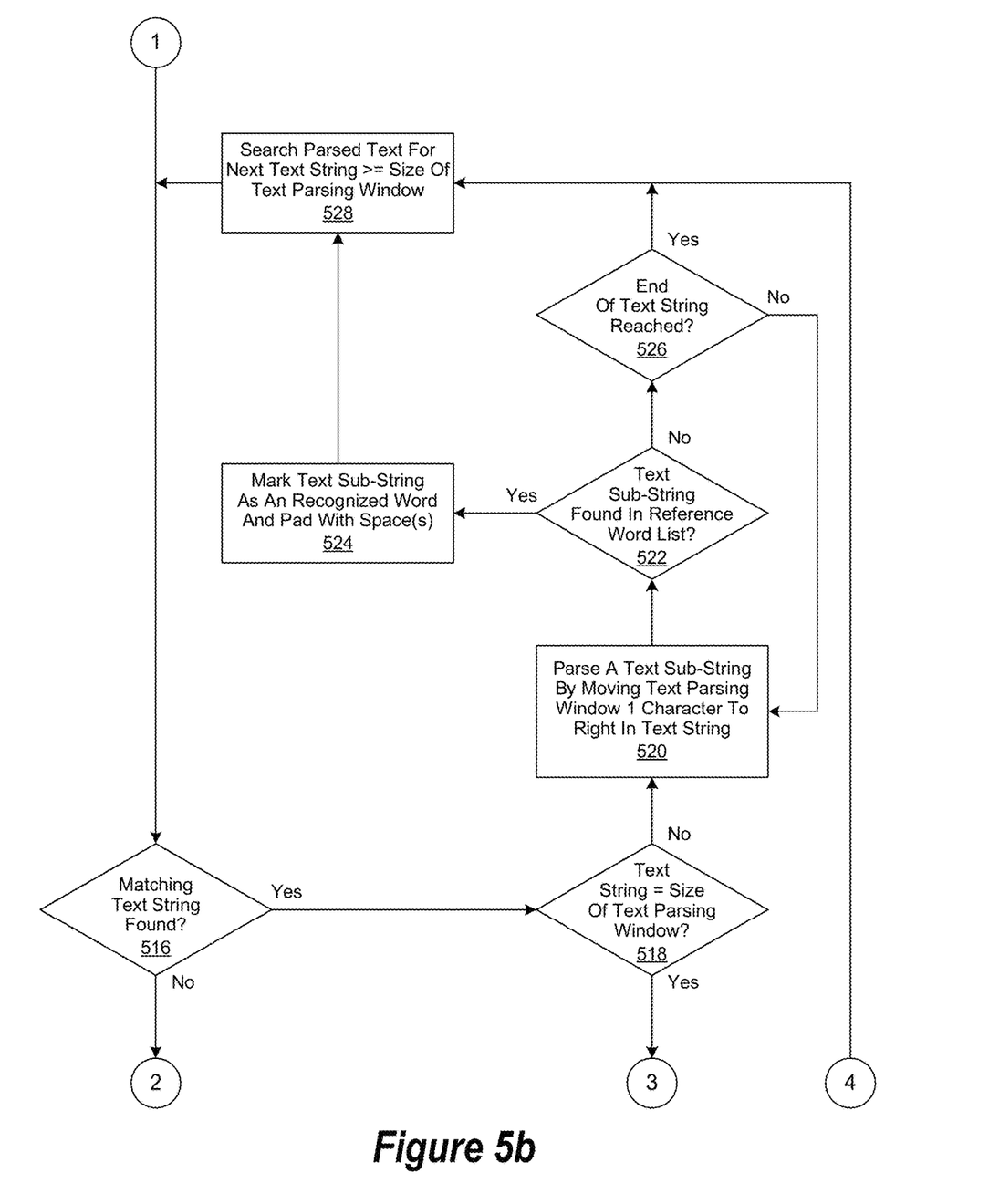
Figure 5C:
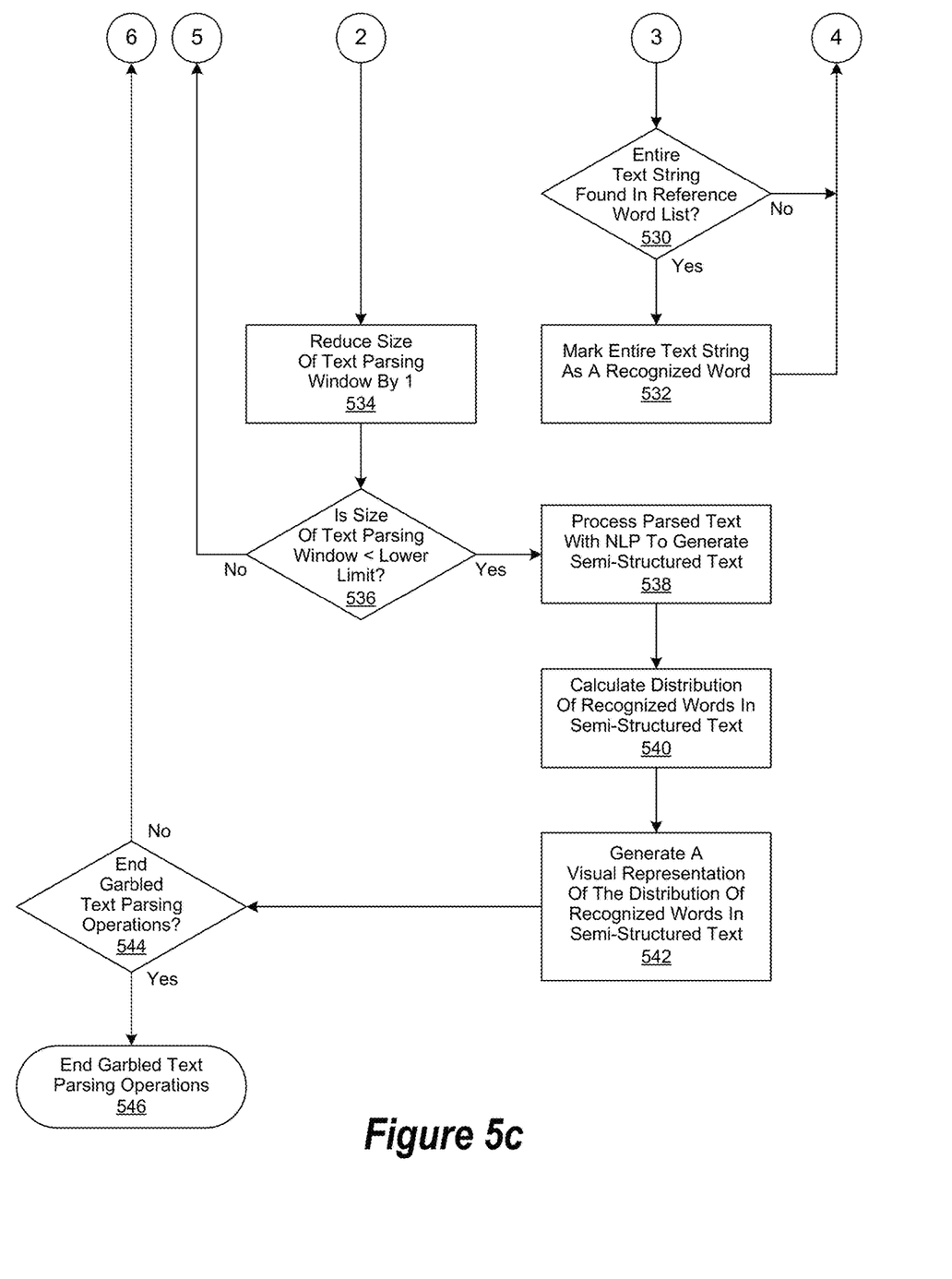

FIGS. 5a through 5c are a flowchart showing the performance of garbled text parsing operations implemented in accordance with an embodiment of the invention. In this embodiment, garbled text parsing operations are begun in step 502, followed by selecting the upper and lower limits in step 504 for the size of a text parsing window, described in greater detail herein. A corpus of garbled text is then received in step 506, followed by data normalization operations being performed in step 508 such that all characters within the corpus of garbled text are converted to either lower or upper case. The resulting normalized corpus of text is then parsed in step 510 to generate parsed text strings of individually-parsed characters. In certain embodiments, the resulting text strings of individually-parsed characters are respectively separated by spaces, as described in greater detail herein.

The size of the text parsing window is set to its upper limit in step 512 and is then used in step 514 to search the parsed text for the first text string that is greater than, or equal to, the current size of the text parsing window. A determination is then made in step 516 whether a matching text string has been found. If so, then a determination is made in step 518 whether the size of the matching text string is equal to the current size of the text parsing window. If not, then a sub-string of text string is parsed in step 520 by moving the text parsing window within the text string one character to the right, as described in greater detail herein.

A determination is then made in step 522 whether the text within the parsed sub-string of text is found in a reference word list. If so, then the parsed sub-string of text is marked as a recognized word and padded with one or more spaces, as likewise described in greater detail, in step 524. If not, then a determination is made in step 526 whether the end of the text string has been reached. If not, then the process is continued, proceeding with step 520. Otherwise, or once the text sub-string has been marked as a recognized word in step 524, then the parsed text is searched in step 528 for the next text string that is greater than, or equal to, the current size of the text parsing window. The process is then continued, proceeding with step 516.

However, if it was determined in step 518 that the text entire string was equal to the size of the text parsing window, then a determination is made in step 530 whether the entire text string was found in a reference word list. If so, then the entire text string is marked as a recognized word. Thereafter, or if it was determined in step 530 that the entire text string was not found in a reference word list, the process is continued, proceeding with step 528. Likewise, if it was determined in step 516 that a text string matching the current size of the text parsing window was not found, then the size of text parsing window is reduced, as described in greater detail herein, by one character in step 534.

A determination is then made in step 536 whether the current size of the text parsing window is smaller than its lower limit. If not, then the process is continued, proceeding with step 514. Otherwise, Natural Language Processing (NLP) approaches familiar to those of skill in the art are used in step 538 to generate semi-structured text, described in greater detail herein, from the parsed text. The distribution of recognized words within the semi-structured text is calculated in step 540, followed by the generation of a visual representation of the recognized word distribution in step 542. A determination is then made in step 544 whether to end garbled text parsing operations. If not, then the process is continued, proceeding with step 504. Otherwise, garbled text parsing operations are ended in step 546.

Figure 6:
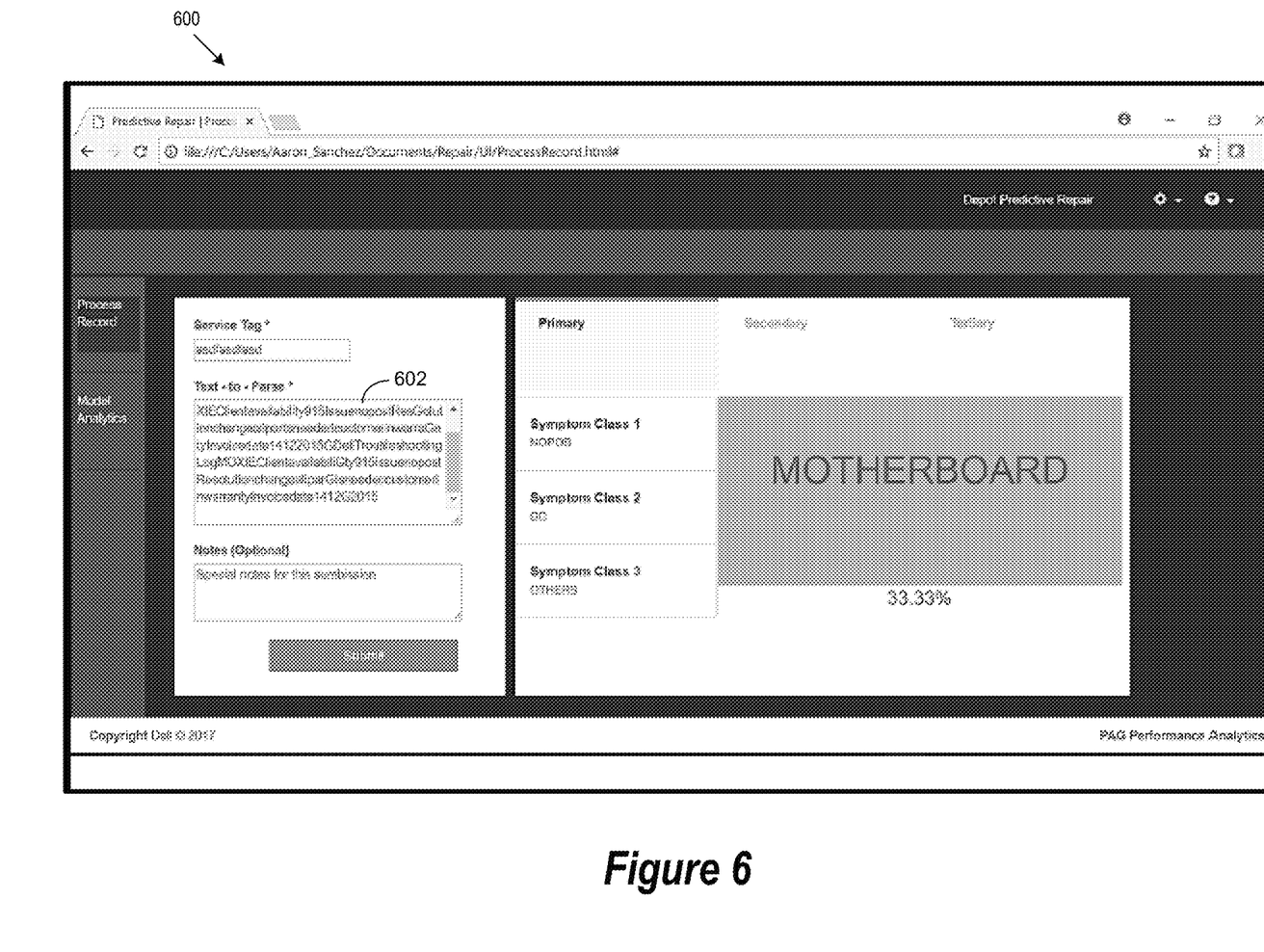
FIG. 6 shows an example screen presentation of a garbled text parsing system user interface.

FIG. 6 shows an example screen presentation of a garbled text parsing system user interface (UI). In certain embodiments, garbled text 602 originally presented within the garbled text parsing system user interface (UI) 600 may be replaced with semi-structured text generated as a result of various garbled text parsing operations, described in greater detail herein.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a text parsing operation, comprising:
   receiving a corpus of text, the corpus of text comprising a text string, at least a portion of the corpus of text comprising garbled text, the garbled text comprising a set of confused or unintelligible words, the set of confused or unintelligible words comprising at least one of two words concatenated into a single text string and a mistakenly capitalized character within the text string;
   parsing characters within the corpus of text to provide parsed characters from the corpus of text, the parsing characters within the corpus of text comprising applying a text parsing window to a number of characters to accommodate a string of meaningful text, the parsing characters using the text parsing window to sequentially search characters within the corpus of text;
   parsing the parsed characters to generate recognized words from the parsed characters, the parsing the parsed characters generating words from longer strings of text before words from shorter strings of text, the longer strings of text being identified using a longer text parsing window;
   generating semi-structured text from the recognized words; and,
   calculating a distribution of recognized words from the semi-structured text.

2. The method of claim 1, further comprising:
   normalizing the corpus of text prior to parsing the characters within the corpus of text.

3. The method of claim 2, wherein:
   the normalizing the corpus of text comprises changing a case of at least some of the characters within the corpus of text to conform with a case of other characters within the corpus of text.

4. The method of claim 1, further comprising:
   generating a visual representation of the distribution of recognized words.

5. The method of claim 1, wherein:
   the generating semi-structured text from the recognized words comprises performing a Natural Language Processing operation on the recognized words.

6. The method of claim 1, wherein:
   the calculating a distribution comprises summarizing a frequency distribution of the recognized word.

7. A system comprising:
   a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving a corpus of text, the corpus of text comprising a text string, at least a portion of the corpus of text comprising garbled text, the garbled text comprising a set of confused or unintelligible words, the set of confused or unintelligible words comprising at least one of two words concatenated into a single text string and a mistakenly capitalized character within the text string;

parsing characters within the corpus of text to provide parsed characters from the corpus of text, the parsing characters within the corpus of text comprising applying a text parsing window to a number of characters to accommodate a string of meaningful text, the parsing characters using the text parsing window to sequentially search characters within the corpus of text;

parsing the parsed characters to generate recognized words from the parsed characters, the parsing the parsed characters generating words from longer strings of text before words from shorter strings of text, the longer strings of text being identified using a longer text parsing window;

generating semi-structured text from the recognized words; and, calculating a distribution of recognized words from the semi-structured text.

8. The system of claim 7, wherein the instructions executable by the processor are further configured for:

normalizing the corpus of text prior to parsing the characters within the corpus of text.

9. The system of claim 8, wherein:

the normalizing the corpus of text comprises changing a case of at least some of the characters within the corpus of text to conform with a case of other characters within the corpus of text.

10. The system of claim 7, wherein the instructions executable by the processor are further configured for:

generating a visual representation of the distribution of recognized words.

11. The system of claim 7, wherein:

the generating semi-structured text from the recognized words comprises performing a Natural Language Processing operation on the recognized words.

12. The system of claim 7, wherein:

the calculating a distribution comprises summarizing a frequency distribution of the recognized word.

13. A non-transitory, computer-readable storage medium embodying computer program code, the computer program code comprising computer executable instructions configured for:

receiving a corpus of text, the corpus of text comprising a text string, at least a portion of the corpus of text comprising garbled text, the garbled text comprising a set of confused or unintelligible words, the set of confused or unintelligible words comprising at least one of two words concatenated into a single text string and a mistakenly capitalized character within the text string;

parsing characters within the corpus of text to provide parsed characters from the corpus of text, the parsing characters within the corpus of text comprising applying a text parsing window to a number of characters to accommodate a string of meaningful text, the parsing characters using the text parsing window to sequentially search characters within the corpus of text;

parsing the parsed characters to generate recognized words from the parsed characters, the parsing the parsed characters generating words from longer strings of text before words from shorter strings of text, the longer strings of text being identified using a longer text parsing window;

generating semi-structured text from the recognized words; and, calculating a distribution of recognized words from the semi-structured text.

14. The non-transitory, computer-readable storage medium of claim 13, wherein the computer executable instructions are further configured for:

normalizing the corpus of text prior to parsing the characters within the corpus of text.

15. The non-transitory, computer-readable storage medium of claim 14, wherein:

the normalizing the corpus of text comprises changing a case of at least some of the characters within the corpus of text to conform with a case of other characters within the corpus of text.

16. The non-transitory, computer-readable storage medium of claim 13, wherein the instructions executable by the processor are further configured for:

generating a visual representation of the distribution of recognized words.

17. The non-transitory, computer-readable storage medium of claim 13, wherein:

the generating semi-structured text from the recognized words comprises performing a Natural Language Processing operation on the recognized words.

18. The non-transitory, computer-readable storage medium of claim 13, wherein:

the calculating a distribution comprises summarizing a frequency distribution of the recognized word.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *